United States Patent
Tanaka et al.

(10) Patent No.: US 9,616,878 B2
(45) Date of Patent: Apr. 11, 2017

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Takaaki Tanaka, Susono (JP); Mitsuhiro Tabata, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 36 days.

(21) Appl. No.: 14/441,024

(22) PCT Filed: Jan. 8, 2014

(86) PCT No.: PCT/JP2014/050143
§ 371 (c)(1),
(2) Date: May 6, 2015

(87) PCT Pub. No.: WO2014/115577
PCT Pub. Date: Jul. 31, 2014

(65) Prior Publication Data
US 2015/0298681 A1 Oct. 22, 2015

(30) Foreign Application Priority Data

Jan. 22, 2013 (JP) .................................. 2013-009263

(51) Int. Cl.
*B60W 20/10* (2016.01)
*B60W 20/30* (2016.01)
(Continued)

(52) U.S. Cl.
CPC .............. *B60W 20/10* (2013.01); *B60K 6/48* (2013.01); *B60K 6/547* (2013.01); *B60L 11/14* (2013.01);
(Continued)

(58) Field of Classification Search
CPC ...... B60W 20/10; B60W 20/00; B60W 20/30; B60W 10/02; B60W 10/06; B60W 10/08;
(Continued)

(56) References Cited

U.S. PATENT DOCUMENTS

| 2003/0006076 A1* | 1/2003 | Tamor | B60W 10/06 180/65.25 |
| 2010/0082220 A1* | 4/2010 | Whitney | F02D 11/105 701/102 |

FOREIGN PATENT DOCUMENTS

| CN | 1895944 A | 1/2007 |
| JP | 2007-320497 A | 12/2007 |

(Continued)

*Primary Examiner* — Abby Lin
(74) *Attorney, Agent, or Firm* — Andrews Kurth Kenyon LLP (57) ABSTRACT

A control apparatus is applied to a hybrid vehicle. The hybrid vehicle includes an MG which is connected with an input shaft of a manual transmission via a first clutch that is operated by a press operation to a clutch pedal and an internal combustion engine which is connected with the MG via a second clutch. The hybrid vehicle is allowed to execute an EV traveling mode where: the internal combustion engine is stopped; the internal combustion engine and drive wheels are separated by the second clutch; and the drive wheels are driven by the MG. In the control apparatus, when the EV traveling mode is executed, a required torque is obtained based on an accelerator opening degree, and a required transmission torque is obtained based on an operation amount to the clutch pedal. And, when a smaller one of the required torque and the required transmission torque is greater than a determination value, the internal combustion engine is started.

2 Claims, 4 Drawing Sheets

(51) Int. Cl.
| | |
|---|---|
| *B60W 10/11* | (2012.01) |
| *B60L 15/20* | (2006.01) |
| *F02N 11/08* | (2006.01) |
| *B60K 6/48* | (2007.10) |
| *B60K 6/547* | (2007.10) |
| *B60L 11/14* | (2006.01) |
| *B60W 10/02* | (2006.01) |
| *B60W 10/06* | (2006.01) |
| *B60W 10/08* | (2006.01) |
| *B60W 20/00* | (2016.01) |
| *F16H 59/04* | (2006.01) |
| *F16H 61/02* | (2006.01) |
| *F02D 29/02* | (2006.01) |
| *F16H 63/50* | (2006.01) |
| *F02N 11/04* | (2006.01) |

(52) U.S. Cl.
CPC ......... *B60L 15/2054* (2013.01); *B60W 10/02* (2013.01); *B60W 10/06* (2013.01); *B60W 10/08* (2013.01); *B60W 10/11* (2013.01); *B60W 20/00* (2013.01); *B60W 20/30* (2013.01); *F02D 29/02* (2013.01); *F02N 11/04* (2013.01); *F02N 11/0818* (2013.01); *F16H 59/04* (2013.01); *F16H 61/02* (2013.01); *F16H 63/50* (2013.01); *B60L 2240/423* (2013.01); *B60L 2240/486* (2013.01); *B60L 2250/26* (2013.01); *B60L 2250/28* (2013.01); *B60W 2540/10* (2013.01); *B60W 2540/14* (2013.01); *B60W 2710/06* (2013.01); *B60W 2710/083* (2013.01); *F02N 2200/0802* (2013.01); *F02N 2200/101* (2013.01); *F02N 2200/103* (2013.01); *Y02T 10/48* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/93* (2013.01)

(58) Field of Classification Search
CPC ............ B60W 10/11; B60W 2540/10; B60W 2540/14; B60W 2710/06; B60W 2710/083; B60L 11/14; B60L 2240/423; B60L 2240/486; B60L 2250/26; B60L 2250/28; B60K 6/48; B60K 6/547; F02D 29/02; F02N 11/04; F02N 11/0818; F02N 2200/08; F02N 2200/101; F02N 2200/103; F16H 59/04; F16H 61/02; F16H 63/50; Y02T 10/48; Y02T 10/6221; Y02T 10/645; Y02T 10/70; Y02T 10/7077; Y02T 10/72; Y02T 10/7275; Y02T 903/93

See application file for complete search history.

(56) References Cited

FOREIGN PATENT DOCUMENTS

| | | |
|---|---|---|
| JP | 2009-292313 A | 12/2009 |
| JP | 2010-184535 A | 8/2010 |
| JP | 2010-254014 A | 11/2010 |
| WO | 2014/115635 A1 | 7/2014 |

* cited by examiner

CONTROL APPARATUS FOR HYBRID VEHICLE

CROSS-REFERENCE TO RELATED APPLICATIONS

This is a national phase application based on the PCT International Patent Application No. PCT/JP2014/050143 filed Jan. 8, 2014, claiming priority to Japanese Patent Application No. 2013-009263 filed Jan. 22, 2013, the entire contents of both of which are incorporated herein by reference.

TECHNICAL FIELD

The present invention relates to a control apparatus for a hybrid vehicle. The hybrid vehicle is provided with a clutch which is provided, so as to be operated with a clutch pedal, on a power transmission path lying between the internal combustion engine and drive wheels, and is capable of performing an EV traveling mode that the internal combustion engine is stopped, a power transmission lying between the internal combustion engine and the drive wheels is shut off, and the drive wheels are driven by an electric motor.

BACKGROUND ART

There is known a hybrid vehicle having an internal combustion engine and an electric motor as driving sources for traveling. Furthermore, in such a hybrid vehicle, there is known a vehicle where a manual transmission and a manual-type clutch which is operated with a clutch pedal are provided on a power transmission path lying between the internal combustion engine and drive wheels, and the electric motor is provided between an output shaft of the manual transmission and the drive wheels (see Patent Literature 1). In the vehicle of the Patent Literature 1, when the vehicle is started with the electric motor, a driving torque which occurs when it is assumed that the vehicle is started with the internal combustion engine is calculated based on an operation amount of a clutch pedal, an accelerator opening degree, and a gear stage, and the calculated driving torque is output from the electric motor. Furthermore, when the accelerator opening degree is greater than a predetermined opening degree the vehicle is driven by the internal combustion engine. In addition, there is Patent Literature 2 as a prior art reference in relation to the present invention.

CITATION LIST

Patent Literature

Patent Literature 1: JP 2009-292313 A
Patent Literature 2: JP 2010-184535 A

SUMMARY OF INVENTION

Technical Problem

In the vehicle of the Patent Literature 1, in a case that the vehicle is started with the electric motor, a change of a vibration of the internal combustion engine, a reduction of rotating speed, and so on do not occur at the moment when the clutch pedal is operated. Thereby, there is a possibility that a driver steps on the accelerator pedal to excess accidentally. In this case, there is a possibility that the accelerator opening degree becomes greater than the predetermined opening degree and the internal combustion engine is started up. In this manner, in the vehicle of the Patent Literature 1, there is a possibility that the internal combustion engine is started up unnecessarily and fuel efficiency becomes worse.

In view of the foregoing, one object of the present invention is to provide a control apparatus for a hybrid vehicle capable of suppressing an unnecessary start-up of the internal combustion engine and improving fuel efficiency.

Solution to Problem

A control apparatus of the present invention is applied to a hybrid vehicle, the hybrid vehicle having an internal combustion engine and an electric motor as driving sources for traveling, and a power transmission control device, the power transmission control device: being allowed to be operated with a clutch pedal; being provided in a power transmission path lying between the internal combustion engine and a drive wheel; and being allowed to shut off a power transmission between the internal combustion engine and the drive wheel, the electric motor being provided so as to make the drive wheel drive even when the power transmission control device shuts off the power transmission between the internal combustion engine and the drive wheel, and the hybrid vehicle being allowed to execute an EV traveling mode where: the internal combustion engine is stopped; the power transmission between the internal combustion engine and the drive wheel is shut off; and the drive wheel is driven by the electric motor, wherein the control apparatus includes a torque obtaining device which obtains, when the EV traveling mode is being executed, a required torque which is required to the vehicle based on an accelerator opening degree of the vehicle and obtains a required transmission torque which is to be transmitted via the power transmission control device based on an operation amount of the clutch pedal, a required value setting device which sets a required value to the required transmission torque when the required torque is greater than the required transmission torque, and sets the required value to the required torque when the required torque is equal to or less than the required transmission torque, and a starting control device which starts the internal combustion engine when the required value that has been set by the required value setting device is greater than a predetermined determination value.

In the control apparatus of the present invention, the required torque is obtained based on the accelerator opening degree, and the required transmission torque is obtained based on the operation amount to the clutch pedal. These torques are torques that a driver requires to the vehicle. And, the required value is set to a smaller one of these torques. When the required value is greater than the determination value, the internal combustion engine is started. Thereby, for example, even though the driver presses an accelerator pedal accidentally while pressing the clutch pedal, when the required transmission torque is equal to or less than the determination value, it is possible to suppress a starting of the internal combustion engine. Accordingly, it is possible to suppress an unnecessary starting of the internal combustion engine, and it is possible to improve fuel efficiency.

In one embodiment of the control apparatus of the present invention, a manual transmission may be provided in the power transmission path lying between the internal combustion engine and the drive wheel, the manual transmission may include: an input shaft; an output shaft; and a plurality of gear stages which are intervened between the input shaft and the output shaft and has different gear ratios from each other, the manual transmission may be made by an operation to a shift lever to: change the gear stages to be used for transmitting rotation between the input shaft and the output shaft; and switch a state of the manual transmission to a neutral state where a power transmission between the input shaft and the output shaft is shut off, and the required value setting device may include a correction device which corrects the required value so as to decrease the required value as compared with a case that any one of the plurality of gear stages is selected, when the manual transmission is in the neutral state. In general, when the manual transmission is in the neutral state, it is considered that the driver does not require a torque to the vehicle. In this embodiment, in such a case, since the required value decreases, the internal combustion engine is hard to start. Thereby, it is possible to suppress the unnecessary starting of the internal combustion engine.

DESCRIPTION OF EMBODIMENTS

Figure 1:
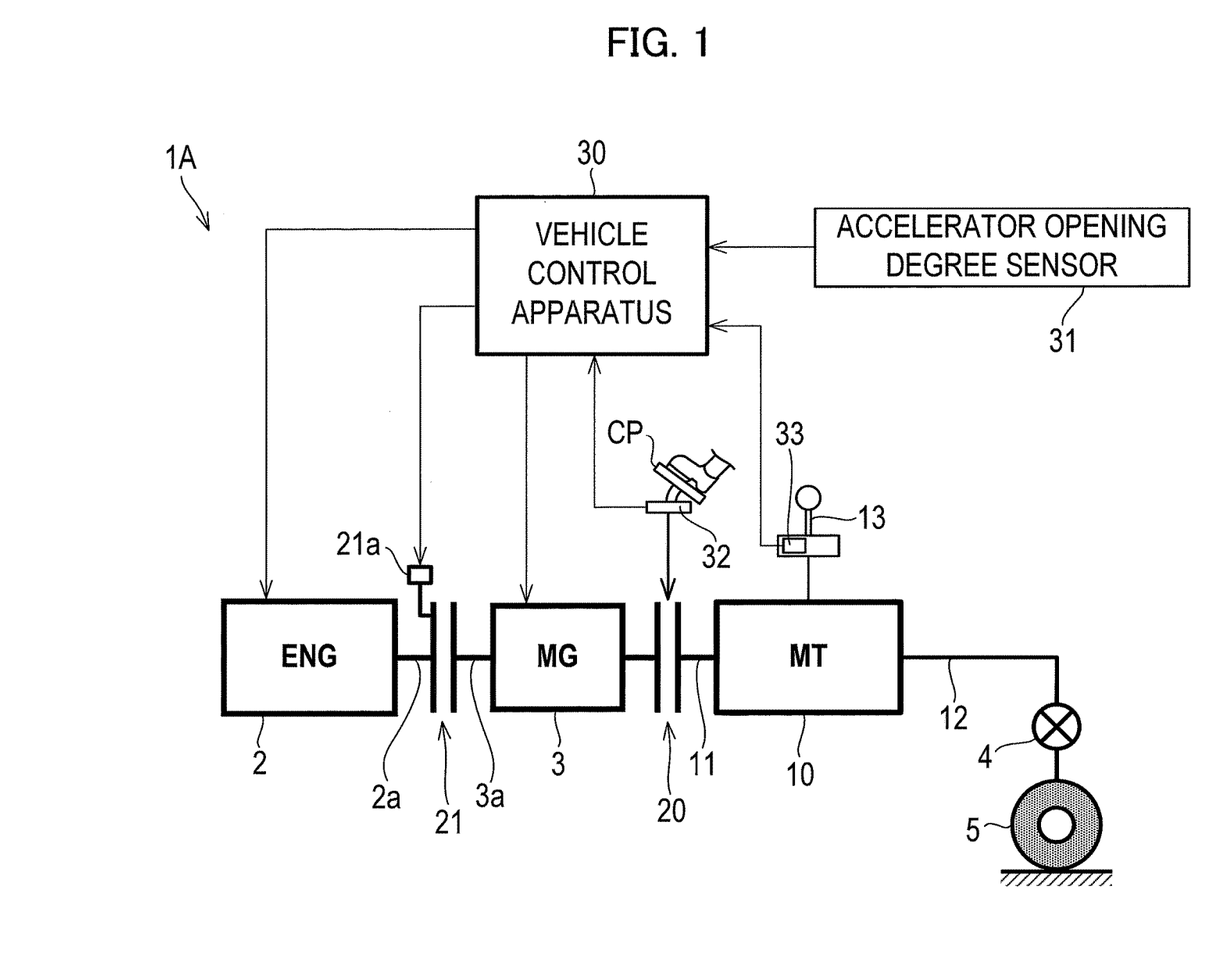
FIG. 1 is a schematic diagram showing main portions of a vehicle where a control apparatus according to one embodiment of the present invention is incorporated.

FIG. 1 schematically shows main portions of a vehicle where a control apparatus according to one embodiment of the present invention is incorporated. The vehicle 1A includes an internal combustion engine (hereinafter, referred to as an engine) 2 and a motor generator (hereinafter, referred to as an MG) 3 as an electric motor, as driving sources for travelling. That is, the vehicle 1A is configured as a hybrid vehicle. The engine 2 is a well-known spark ignition type internal combustion engine which is mounted on the hybrid vehicle. The MG 3 is a well known motor generator which is mounted on a hybrid vehicle to function as an electric motor and a generator.

Furthermore, a manual transmission (hereinafter, referred to as a transmission) 10 is mounted on the vehicle 1A. The transmission 10 is configured as a manual transmission providing one-five forward gear stages and one reverse gear stage. The transmission 10 includes an input shaft 11 and an output shaft 12. Gear pairs (not shown) which correspond to first to fifth gears are provided respectively between the input shaft 11 and the output shaft 12. Gear ratios are set to the gear pairs respectively, so that the gear ratios are different from each other. The gear ratios are set so as to get smaller in the order of the gear pair of the first gear, the gear pair of the second gear, the gear pair of the third gear, the gear pair of the fourth gear, and the gear pair of the fifth gear. The transmission 10 is configured so as to establish selectively a transmission of rotation with any one of the gear pairs. The transmission 10 includes a shift lever 13 which is operated by a driver. In the transmission 10, when the driver operates the shift lever 13, the gear pairs which are used for the transmission of rotation between the input shaft 11 and the output shaft 12 changes over from one to another, and the gear stages are changed from one to another. Furthermore, the transmission 10 is configured so as to be allowed to change its state into a neutral state where the transmission of rotation between the input shaft 11 and the output shaft 12 is shut off. When the shift lever 13 is operated to a neutral position, the state of the transmission 10 is changed to the neutral state. A structure of the transmission 10 is the same as a structure of a well known manual transmission which is mounted on a vehicle. Thereby, a detailed description of the structure of the transmission 10 will be omitted.

The input shaft 11 of the transmission 10 is connected with the rotor shaft 3a of the MG 3 via a first clutch 20. The first clutch 20 is a well known friction clutch. The first clutch 20 is configured so as to be allowed to switch its state between a fully engaged state where the input shaft 11 and the rotor shaft 3a rotate integrally with each other and a release state where the input shaft 11 and the rotor shaft 3a are separated from each other. Furthermore, the first clutch 20 is allowed to switch its state to a state, so-called a half clutch state, where a power is transmitted between the rotor shaft 3a and the input shaft 11 while the rotor shaft 3a and the input shaft 11 rotate at different rotating speeds from each other. The first clutch 20 is operated with a clutch pedal CP. When the clutch pedal CP is stepped on, the state of the first clutch 20 is switched to the release state. When the clutch pedal CP is released, the state of the first clutch 20 is switched to the fully engaged state. Furthermore, when the clutch pedal CP is partially stepped on, the state of the first clutch 20 is switched to the half clutch state. The relation between the clutch pedal CP and the state of the first clutch 20 is the same as the relation of a well known manual-type clutch. Thereby, a detailed description of the relation between the first clutch 20 and the clutch pedal CP will be omitted.

The rotor shaft 3a of the MG 3 is connected with the output shaft 2a of the engine 2 via a second clutch 21. The second clutch 21 is also a well known friction clutch. The second clutch 21 is configured so as to be allowed to switch its state between an engaged state where the output shaft 2a and the rotor shaft 3a rotate integrally and a release state where the output shaft 2a and the rotor shaft 3a are separated from each other. The second clutch 21 includes an actuator 21a for switching the states of the second clutch 21. As described above, the second clutch 21 is configured as an automatic clutch.

The output shaft 12 of the transmission 10 is connected with a differential mechanism 4. The differential mechanism 4 is a well known mechanism which distributes inputted power to the right and left drive wheels 5. In this figure, only one of the drive wheels 5 is shown.

An operation of each of the engine 2, the MG 3, and the second clutch 21 is controlled by a vehicle control apparatus 30. The vehicle control apparatus 30 is configured as a computer unit including a microprocessor and peripheral devices, such as a RAM and a ROM, which are necessary for operations of the microprocessor. The vehicle control apparatus 30 holds various control programs for making the vehicle 1A run appropriately. The vehicle control apparatus 30 controls control objects such as the engine 2 and the MG 3 by executing these programs. The vehicle control apparatus 30 is connected with various sensors for obtaining information with respect to the vehicle 1A. The vehicle control apparatus 30 is connected with an accelerator opening degree sensor 31, a clutch pedal sensor 32, and a shift lever sensor 33, for example. The accelerator opening degree sensor 31 outputs a signal corresponding to a pressing amount of an accelerator pedal, that is, an accelerator opening degree. The clutch pedal sensor 32 outputs a signal corresponding to a pressing amount (an operation amount) of the clutch pedal CP. The shift lever sensor 33 outputs a signal according to a position of the shift lever 13. In addition, various sensors are further connected to the vehicle control apparatus 30, but they are omitted in the figure.

In the vehicle 1A, the operations of the engine 2, the MG 3, and the second clutch 21 are controlled to realize plural traveling modes. As the plural traveling modes, an EV traveling mode and an engine traveling mode are set, for example. In the EV traveling mode, the state of the second clutch 21 is switched to the release state, and the engine 2 is stopped. And, the drive wheels 5 are driven by the MG 3. In the engine traveling mode, the state of the second clutch 21 is switched to the engaged state. And, the drive wheels 5 are driven by the engine 2 mainly. These traveling modes are executed not only when the vehicle 1A is traveling but also when the vehicle 1A is being parked. Thereby, in a case that the EV traveling mode is executed when the vehicle 1A is being parked, the vehicle 1A is started by the MG 3. On the other hand, in a case that the engine traveling mode is executed when the vehicle 1A is being parked, the vehicle 1A is started by the engine 2 mainly.

The vehicle control apparatus 30 switches the traveling modes according to driving power which is required to the vehicle 1A by the driver or the like. For example, when the accelerator opening degree is less than a determination opening degree predetermined, the vehicle control apparatus 30 switches the traveling mode to the EV traveling mode. Furthermore, when the accelerator opening degree is equal to or greater than the determination opening degree, the vehicle control apparatus 30 switches the traveling mode to the engine traveling mode.

Figure 2:
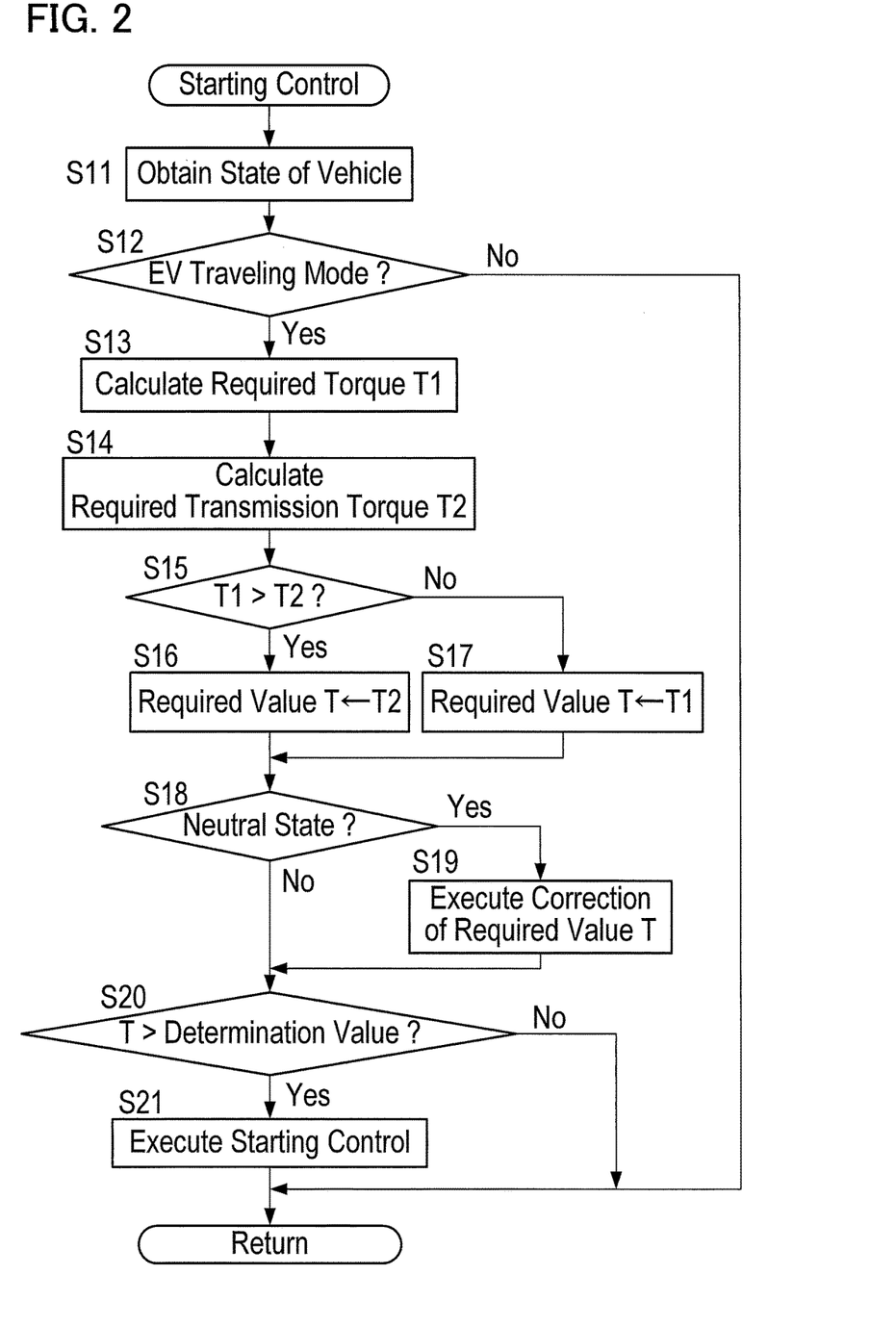
FIG. 2 is a flowchart showing a starting control routine executed by a vehicle control apparatus.

When the traveling mode is switched from the EV traveling mode to the engine traveling mode, it is necessary to start the engine 2. FIG. 2 shows a starting control routine that the vehicle control apparatus 30 executes for controlling a starting of the engine 2 during the EV traveling mode. The vehicle control apparatus 30 repeatedly executes this control routine at predetermined intervals regardless of whether the vehicle 1A is being travelling or being parked.

In the control routine, the vehicle control apparatus 30 first obtains a state of the vehicle 1A in step S11. The vehicle control apparatus 30 obtains, for example, the accelerator opening degree, the pressing amount of the clutch pedal CP, and a state of the transmission 10, as the state of the vehicle 1A. The vehicle control apparatus 30 obtains the neutral state or any one of the gear stages, as the state of the transmission 10. The state of the transmission 10 may be obtained based on the output signal of the shift lever sensor 33. In next step S12, the vehicle control apparatus 30 determines whether or not the current traveling mode is the EV traveling mode. When the vehicle control apparatus 30 determines that the current traveling mode is the engine traveling mode, the vehicle control apparatus 30 ends the present control routine.

Figure 3:
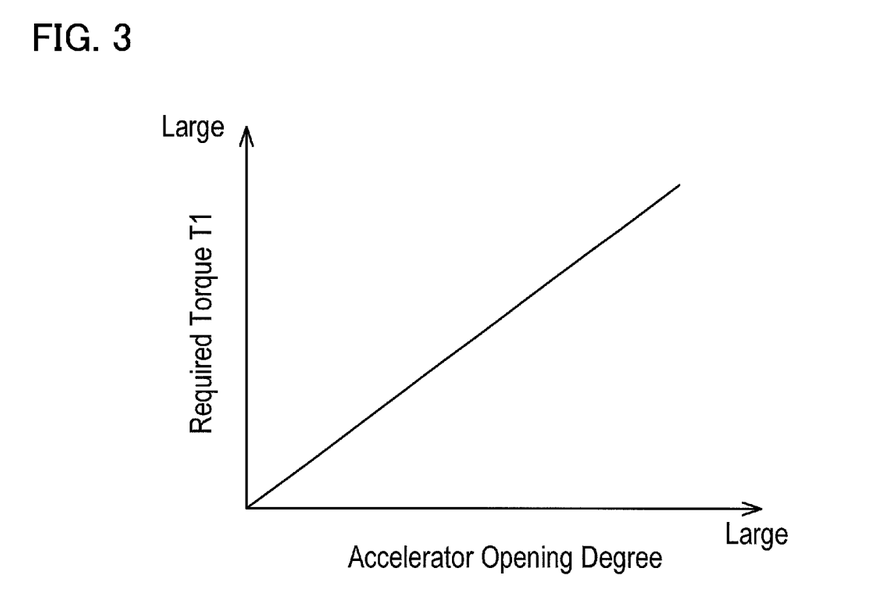
FIG. 3 is a diagram showing an example of a relation between an accelerator opening degree and a required torque.
Figure 4:
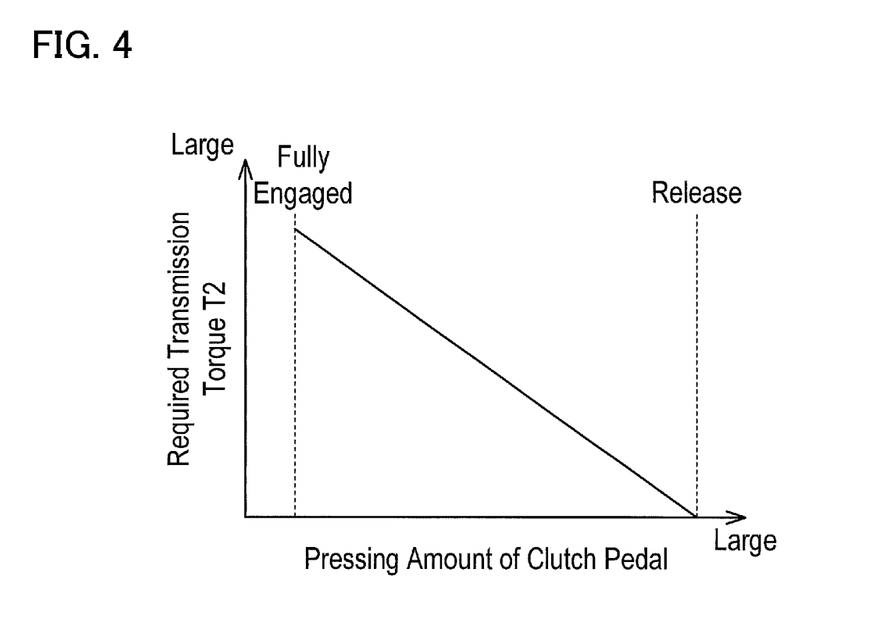
FIG. 4 is a diagram showing an example of a relation between a pressing amount of a clutch pedal and a required transmission torque.

On the other hand, when the vehicle control apparatus 30 determines that the current traveling mode is the EV traveling mode, the vehicle control apparatus 30 goes to step S13 and calculates a required torque T1 which is required to the vehicle 1A by the driver based on the accelerator opening degree. FIG. 3 shows an example of a relation between the accelerator opening degree and the required torque T1. As shown in this figure, the required torque T1 increases as the accelerator opening degree increases. The required torque T1 may be calculated based on the relation shown in this figure. The relation shown in this figure may be obtained in advance through experiments, numerical calculations, or the like, and stored as a map in the ROM of the vehicle control apparatus 30. In next step S14, the vehicle control apparatus 30 calculates a required transmission torque T2 to be transmitted via the first clutch 20 based on the pressing amount of the clutch pedal CP. FIG. 4 shows an example of a relation between the pressing amount of the clutch pedal CP and the required transmission torque T2. As shown in this figure, the required transmission torque T2 decreases as the pressing amount of the clutch pedal CP increases. And, when the pressing amount of the clutch pedal CP reaches a pressing amount that the state of the first clutch 20 is switched to the release state, the required transmission torque T2 becomes 0. The required transmission torque T2 may be calculated based on the relation shown in this figure. The relation shown in this figure may be obtained in advance through experiments, numerical calculations, or the like, and stored as a map in the ROM of the vehicle control apparatus 30.

In next step S15, the vehicle control apparatus 30 determines whether or not the required torque T1 is greater than the required transmission torque T2. When the vehicle control apparatus 30 determines that the required torque T1 is greater than the required transmission torque T2, the vehicle control apparatus 30 goes to step S16 and assigns the required transmission torque T2 to a required value T. On the other hand, when the vehicle control apparatus 30 determines that the required torque T1 is equal to or less than the required transmission torque T2, the vehicle control apparatus 30 goes to step S17 and assigns the required torque T1 to the required value T.

After assigning the required torque T1 or the required transmission torque T2 to the required value T, the vehicle control apparatus 30 goes to step S18 and determines whether or not the transmission 10 is in the neutral state. When the vehicle control apparatus 30 determines that the transmission 10 is in the neutral state, the vehicle control apparatus 30 goes to step S19 and corrects the required value T. In this correction, the required value T is multiplied by a correction value which decreases the required value T, for example, 0.1. Thus, the required value T is decreased.

After correcting the required value T or when the vehicle control apparatus 30 determines that the transmission 10 is not in the neutral state, the vehicle control apparatus 30 goes to step S20 and determines whether or not the required value T is greater than a determination value predetermined. The determination value is a value which is set as a criterion for determining whether or not it is necessary to start the engine 2. The determination value is appropriately set based on speed of the vehicle 1A (vehicle speed), a remaining amount of a battery which is connected with the MG 3, and so on. For example, the determination value is set to a smaller value as the vehicle speed increases. Furthermore, the determination value is set to a smaller value as the remaining amount of the battery decreases. When the vehicle control apparatus 30 determines that the required value T is equal to or less than the determination value predetermined, the vehicle control apparatus 30 ends the present control routine.

On the other hand, when the vehicle control apparatus 30 determines that the required value T is greater than the determination value predetermined, the vehicle control apparatus 30 goes to step S21 and executes an engine starting control. In the engine starting control, the vehicle control apparatus 30 starts the engine 2 by controlling a starting motor (not shown) which is provided on the engine 2. Thereafter, the vehicle control apparatus 30 ends the present control routine.

As described above, in the present invention, the required torque T1 is calculated based on the accelerator opening degree, and the required transmission torque T2 is calculated based on the pressing amount of the clutch pedal CP. Both of them are torques which are required to the vehicle 1A by the driver. And, when a smaller one of the two torques is greater than the determination value, the engine 2 is started. Thereby, for example, even though the driver presses the accelerator pedal accidentally while pressing the clutch pedal CP, when the required transmission torque T2 is equal to or less than the determination value, it is possible to suppress a starting of the internal combustion engine. Accordingly, it is possible to suppress an unnecessary starting of the engine 2, and it is possible to improve fuel efficiency.

Furthermore, in the present invention, when the transmission 10 is in the neutral state, the required value T is decreased as compared with a case that the transmission 10 is in other state, for example, in any one of the first to fifth gears. In general, when the transmission 10 is in the neutral state, it is considered that the driver does not require a torque to the vehicle 1A. Thereby, by correcting the required value T so as to be decreased in this manner, it is possible to suppress the unnecessary starting of the engine 2.

In the above described embodiment, the required torque T1 is calculated by using the accelerator opening degree only. However, the calculation method of the required torque T1 is not limited to this method. For example, the required torque T1 may be calculated based on the accelerator opening degree and the vehicle speed, the accelerator opening degree and a rotating speed of the input shaft 11 of the transmission 10, or the accelerator opening degree and the gear stage.

In the vehicle 1A, the second clutch 21 which is provided between the engine 2 and the MG 3 is not limited to the friction clutch. Various clutches which are capable to connect the engine 2 and the MG 3 and to release the connection, for example an electro-magnetic clutch, may be used as the second clutch 21.

In the above described embodiment, the MG 3 corresponds to an electric motor of the present invention. Furthermore, the first clutch 20 corresponds to a clutch of the present invention. And, the first clutch 20 and the second clutch 21 correspond to a power transmission control device of the present invention. By executing steps S13 and S14 of FIG. 2, the vehicle control apparatus 30 functions as a torque obtaining device of the present invention. By executing steps S15 to S17 of FIG. 2, the vehicle control apparatus 30 functions as a required value setting device of the present invention. By executing steps S20 and S21 of FIG. 2, the vehicle control apparatus 30 functions as a starting control device of the present invention. By executing steps S18 and S19 of FIG. 2, the vehicle control apparatus 30 functions as a correction device of the present invention.

Figure 5:
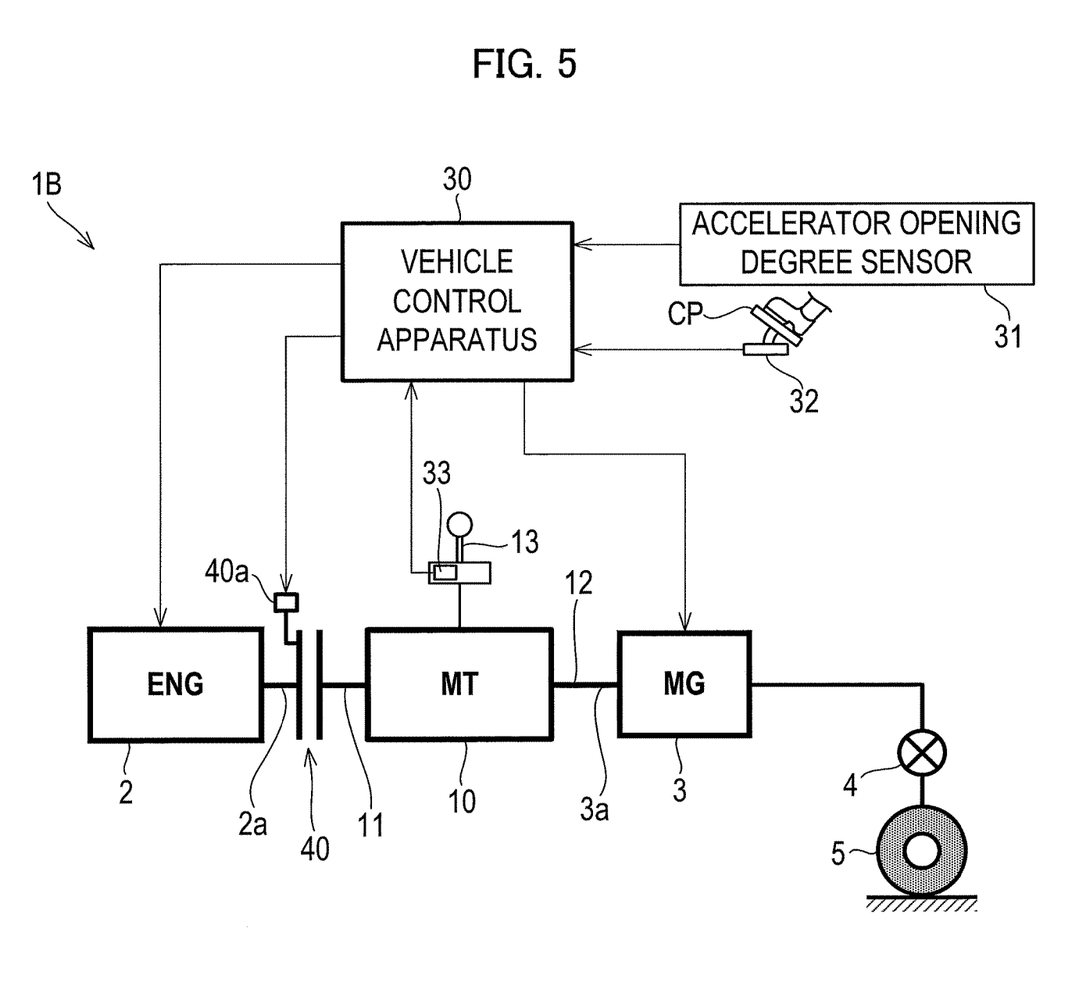
FIG. 5 is a schematic diagram showing main portions of another vehicle where the control apparatus of the present invention is applied.

A hybrid vehicle to which the present invention is applied is not limited to the vehicle shown in FIG. 1. For example, the present invention may be applied to a vehicle 1B shown in FIG. 5. In FIG. 5, the same components as those in FIG. 1 are denoted by the same reference numerals, and descriptions thereof will be omitted. As shown in this figure, in the vehicle 1B, the output shaft 2a of the engine 2 and the input shaft 11 of the transmission 10 are connected with each other via a clutch 40. The clutch 40 includes an actuator 40a for switching the state of the clutch 40. The clutch 40 is configured as with the second clutch 21 of the vehicle 1A. The output shaft 12 of the transmission 10 is connected with the rotor shaft 3a of the MG 3 so as to rotate integrally. Furthermore, the rotor shaft 3a of the MG 3 is also connected with the differential mechanism 4. In the vehicle 1B, the vehicle control apparatus 30 controls the actuator 40a depending on the output signal of the clutch pedal sensor 32. Thereby, the clutch 40 is also operated by the press operation to the clutch pedal CP. However, when the current traveling mode is the EV traveling mode, the vehicle control apparatus 30 switches the state of the clutch 40 to the release state so that a power transmission between the engine 2 and the drive wheels 5 is shut off.

Even in such the vehicle 1B, as with the above described embodiment, by the starting control routine of FIG. 2 which is executed by the vehicle control apparatus 30, it is possible to suppress the unnecessary starting of the engine 2. Thereby, it is possible to improve the fuel efficiency. In the vehicle 1B, the clutch 40 corresponds to the power transmission control device of the present invention.

The present invention is not limited to the above described embodiments, and various modifications of the present invention may be provided. For example, the transmission of the vehicle to which the present invention is applied is not limited to a transmission the top gear of which is a 5th gear. The transmission may be a transmission the top gear of which is a 3rd gear, 4th gear, 6th gear, or higher than 6th. Furthermore, in a hybrid vehicle to which the present invention is applied, an electric motor may be provided instead of the motor generator.

The invention claimed is:

1. A hybrid vehicle, comprising:
an internal combustion engine and an electric motor as driving sources for traveling;
a power transmission control device configured to be operated with a clutch pedal, provided in a power transmission path lying between the internal combustion engine and a drive wheel, and configured to shut off a power transmission between the internal combustion engine and the drive wheel;
a control apparatus configured to control the internal combustion engine;
wherein the electric motor is configured to drive the drive wheel even when the power transmission control device shuts off the power transmission between the internal combustion engine and the drive wheel;
wherein the hybrid vehicle is configured to execute an EV traveling mode, wherein the internal combustion engine is stopped, the power transmission between the internal combustion engine and the drive wheel is shut off, and the drive wheel is drive by the electric motor; and
wherein the control apparatus is programmed to:
calculate, with torque obtaining programming instructions, when the EV traveling mode is being executed, 1) a required torque which is required to the vehicle based on an accelerator opening degree of the vehicle and 2) a required transmission torque which is to be transmitted via the power transmission control device based on an operation amount of the clutch pedal,
when the required torque is greater than the required transmission torque, set a required value to the required transmission torque with required value setting programming instructions,
when the required torque is equal to or less than the required transmission torque, set the required value to the required torque with the required value setting programming instructions, and start the internal combustion engine when the required value set by the required value setting programming instructions is greater than a predetermined determination value.

2. The hybrid vehicle according to claim 1, further comprising:

a manual transmission provided in the power transmission path lying between the internal combustion engine and the drive wheel, Wherein the manual transmission includes an input shaft, an output shaft, and a plurality of gear stages which are intervened between the input shaft and the output shaft, and each gear stage has a different gear ratio from each other, Wherein the manual transmission is made by an operation to a shift lever to change the gear stages to be used for transmitting rotation between the input shaft and the output shaft and switch a state of the manual transmission to a neutral state, in which a power transmission between the input shaft and the output shaft is shut off, and wherein the control apparatus is further configured to correct the set required value so that the set required value when the manual transmission is in a neutral state is smaller than when the set required value when the manual transmission is in the gear stages.

* * * * *